(12) United States Patent
Ichikawa et al.

(10) Patent No.: US 7,826,313 B2
(45) Date of Patent: Nov. 2, 2010

(54) DISK CHANGER

(75) Inventors: Yoshihiro Ichikawa, Saitama (JP); Hideo Ito, Saitama (JP)

(73) Assignee: Pioneer Corporation, Tokyo (JP)

( * ) Notice: Subject to any disclaimer, the term of this patent is extended or adjusted under 35 U.S.C. 154(b) by 1078 days.

(21) Appl. No.: 10/593,558

(22) PCT Filed: Mar. 14, 2005

(86) PCT No.: PCT/JP2005/004438
§ 371 (c)(1), (2), (4) Date: Sep. 20, 2006

(87) PCT Pub. No.: WO2005/098848
PCT Pub. Date: Oct. 20, 2005

(65) Prior Publication Data
US 2007/0195656 A1   Aug. 23, 2007

(30) Foreign Application Priority Data
Mar. 31, 2004 (JP) .............................. 2004-103137
Mar. 31, 2004 (JP) .............................. 2004-103139

(51) Int. Cl.
*G11B 17/03* (2006.01)
(52) U.S. Cl. ................. 369/30.78; 369/30.85; 720/613; 720/614
(58) Field of Classification Search ..... 369/30.49–30.5, 369/30.78–30.79, 30.85–30.86; 720/634, 720/613–614
See application file for complete search history.

(56) References Cited

U.S. PATENT DOCUMENTS

| 5,784,344 | A | * | 7/1998 | Ahn .......................... 369/30.9 |
| 5,828,645 | A | * | 10/1998 | Kim et al. ................ 369/30.78 |
| 5,847,901 | A | * | 12/1998 | Hirsch ..................... 360/99.07 |
| 6,169,712 | B1 | * | 1/2001 | Yoshimura ............... 369/30.78 |
| 6,252,840 | B1 | * | 6/2001 | Miyoshi et al. .......... 369/30.78 |
| 2004/0228226 | A1 | * | 11/2004 | Jang et al. ................ 369/30.36 |

FOREIGN PATENT DOCUMENTS

| JP | 63-16459 A | 1/1988 |
| JP | 63-122052 A | 5/1988 |
| JP | 6-176467 A | 6/1994 |
| JP | 10-199096 A | 7/1998 |
| JP | 2000-100035 A | 4/2000 |
| JP | 2003-196915 A | 7/2003 |

* cited by examiner

Primary Examiner—William J Klimowicz
Assistant Examiner—Carlos E Garcia
(74) Attorney, Agent, or Firm—Foley & Lardner LLP

(57) ABSTRACT

A disk accommodating unit accommodates a plurality of disk trays for holding a disk. A disk processing unit reproduces data from or records data to a loaded disk. A loading mechanism loads a selected disk together with the disk tray from the disk accommodating unit to a position of the disk processing unit. The loading mechanism includes a tray drawing pinion provided in the disk processing unit; a disk tray that includes a tray rack engaged with the tray drawing pinion; and a rack plate that includes a tray drawing rack engaged with the tray drawing pinion, and draws a tray in at a first half process of the loading and stops the tray at a second half process of the loading.

3 Claims, 19 Drawing Sheets

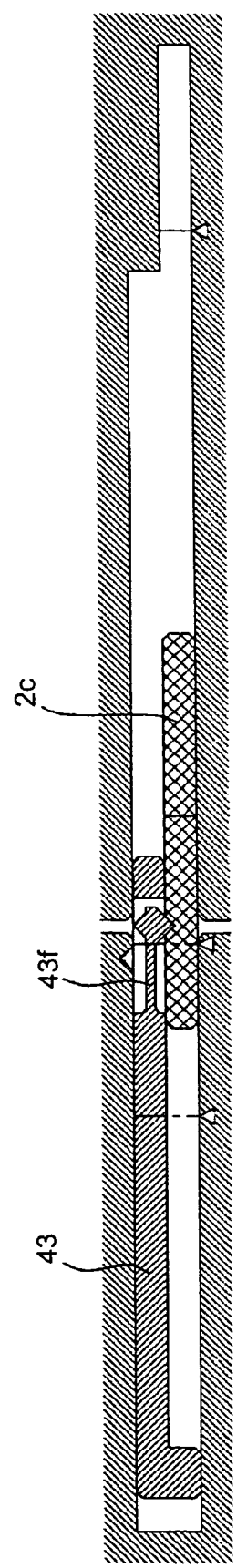

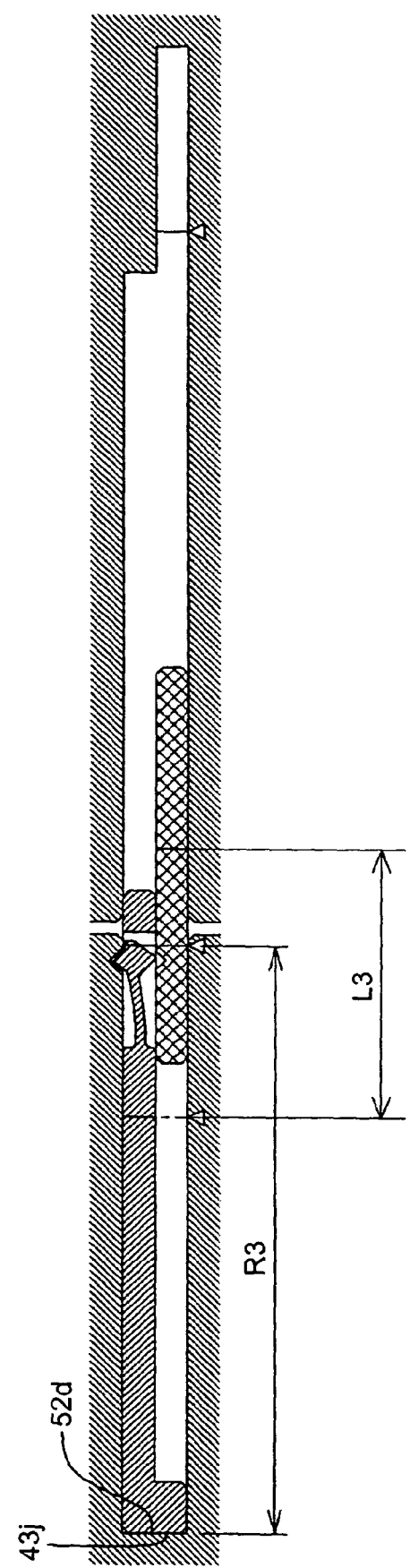

DISK CHANGER

TECHNICAL FIELD

The present invention relates to a disk changer including a plurality of accommodating means for holding a disk such as a CD or a DVD and a disk processing unit that selects one of the accommodating means to load and clamp a disk to reproduce or record data, and more particularly, to a technology for protecting the disk and the accommodating means. Through the specification, the term "processing" refers to reproducing a disk on which data is recorded or recording data on a disk on which no data is recorded.

BACKGROUND ART

A conventional disk player (a disk changer) includes a disk conveying unit that selectively conveys a plurality of trays, each of which accommodates one disk, to different height positions of a reproducing position, and a disk reproducing unit that reproduces a disk positioned at the reproducing position. The disk reproducing unit includes a clamper, a turn table (a disk table) that clamps a disk together with the clamper, a base that supports the turn table, and an ascending and descending unit that ascends and descends the base for moving the turn table between a plurality of height positions and a retracted position. The ascending and descending unit includes a circular cam member that is rotatable about its center and has an inner space and a motor that applies a driving force to the circular cam member. The base is disposed in the space including the center, and a projecting member projecting from the base engages with a cam groove formed on an internally curved face portion of the circular cam member (see, for example, Patent Document 1).

According to the disk player described in the Patent Document 1, a circular gear portion can sequentially move each of the trays to either one of a reproducing position where a disk is reproduced, a position at a front side from the reproducing position and at a back side of a door, namely, a standby position, and an eject position projected forwardly of the door. An upper tray and a lower tray are placed on an upper sub-tray and a lower sub-tray to be relatively movable in front and back directions, respectively, and first and second pinion gears rotated by a circular gear of the circular gear portion are caused to mesh with the upper sub-tray and the upper tray, and the lower sub-tray and the lower tray, so that the upper sub-tray and the lower sub-tray are moved in front and back directions according to rotation of the circular gear.

Patent Document 1: Japanese Patent Application Laid-open No. 2000-100035

DISCLOSURE OF INVENTION

Problem to be Solved by the Invention

However, since a sub-tray larger than the tray itself is used for moving the tray from the reproducing position such as an eject position to a far position, and since the large sub-tray is accommodated in the disk changer, efficiency of utilizing space is decreased and the size of the disk changer is increased.

The present invention has been achieved in view of the above circumstances, and an object of the present invention is to provide a small disk changer by reducing the size of means for moving a disk tray from a reproducing position or a recording position to a far position and performing loading from the far position.

Means for Solving Problem

To solve the above problems and to achieve the object, a disk changer according to another aspect of the present invention includes a disk accommodating unit that accommodates a plurality of disk trays, each of the disk trays holding one disk; a disk processing unit that reproduces data from or records data to a loaded disk; and a loading mechanism that loads a selected disk together with the disk tray from the disk accommodating unit to a position of the disk processing unit. The loading mechanism includes a tray drawing pinion provided in the disk processing unit; a disk tray that is accommodated in the disk accommodating unit and includes a tray rack engaged with the tray drawing pinion; and a rack plate that includes a tray drawing rack engaged with the tray drawing pinion, is extendably attached to the disk tray, draws a tray in at a first half process of the loading, and stops the tray at a second half process of the loading to relay a subsequent drawing to the tray rack.

EFFECT OF THE INVENTION

With the disk changer according to the present invention, the size of the whole disk changer can be reduced.

BRIEF DESCRIPTION OF DRAWINGS

FIG. 8C is a schematic for illustrating the loading step of the third disk tray;

FIG. 8D is a schematic for illustrating the loading step of the third disk tray.

Figure 1A:
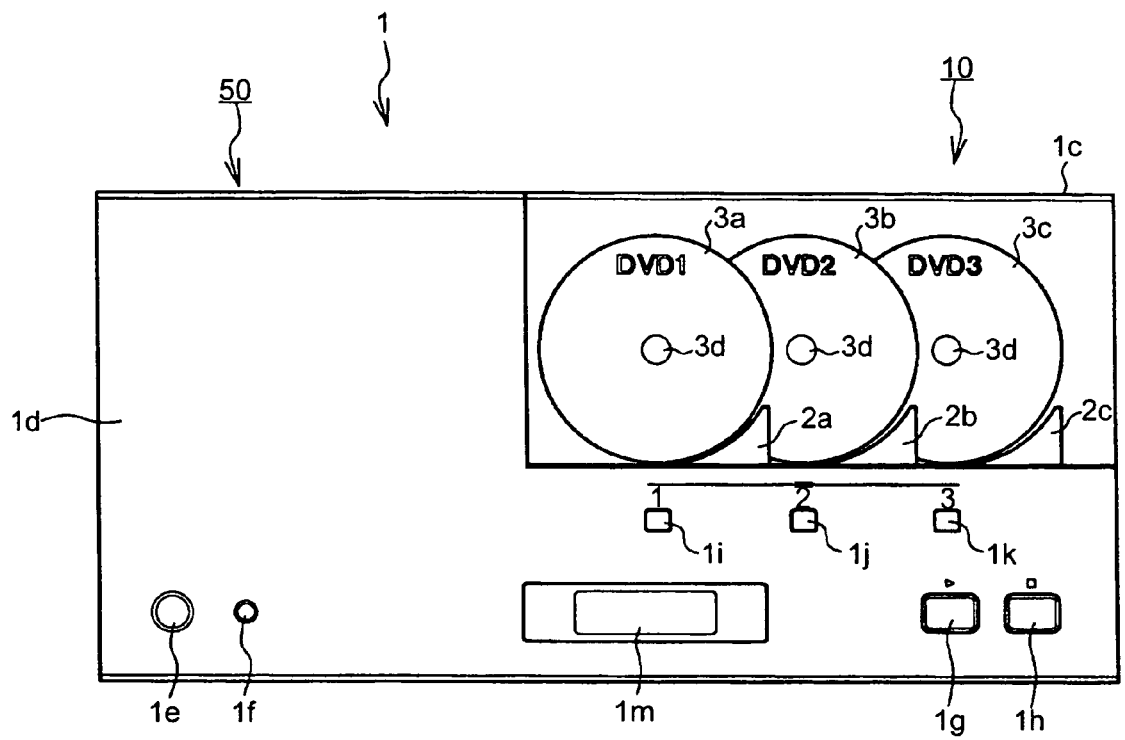
FIG. 1A is a front view of a cabinet of a disk changer according to an embodiment of the present invention.

EXPLANATIONS OF LETTERS OR NUMERALS 2a, 2b, 2c Disk tray (accommodating means) 3a, 3b, 3c Disk
10 Disk accommodating unit
21a Tray rack
21d First recess
30 Rotating mechanism
32 Selecting cam
32b Cam groove
40 Loading mechanism
41a, 42a, 43a Notch
42, 43 Rack plate
42e, 43e Tray drawing rack
43g Inner projection (locking unit)
43h Outer projection (locking unit)
43j End portion (abutting portion)
45 Tray drawing pinion
50 Disk reproducing unit
51a, 52a Supporting shaft (vertical shafts)
52 Tray guide (stopper)
52b Cam pin
52c Guide groove
52d Stopper wall
52e Second recess
55 Clamp cam
55d Motor
60 Lock mechanism
61, 62, 63 Cam plate
61a, 62a, 63a Lock lever (locking units)

BEST MODE(S) FOR CARRYING OUT THE INVENTION

Exemplary embodiments of a disk changer according to the present invention will be explained in detail below with reference to the accompanying drawings. The invention will not be limited to the embodiment.

Figure 1B:
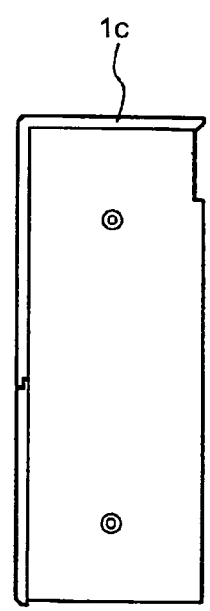
FIG. 1B is a right side view of the cabinet.
Figure 2A:
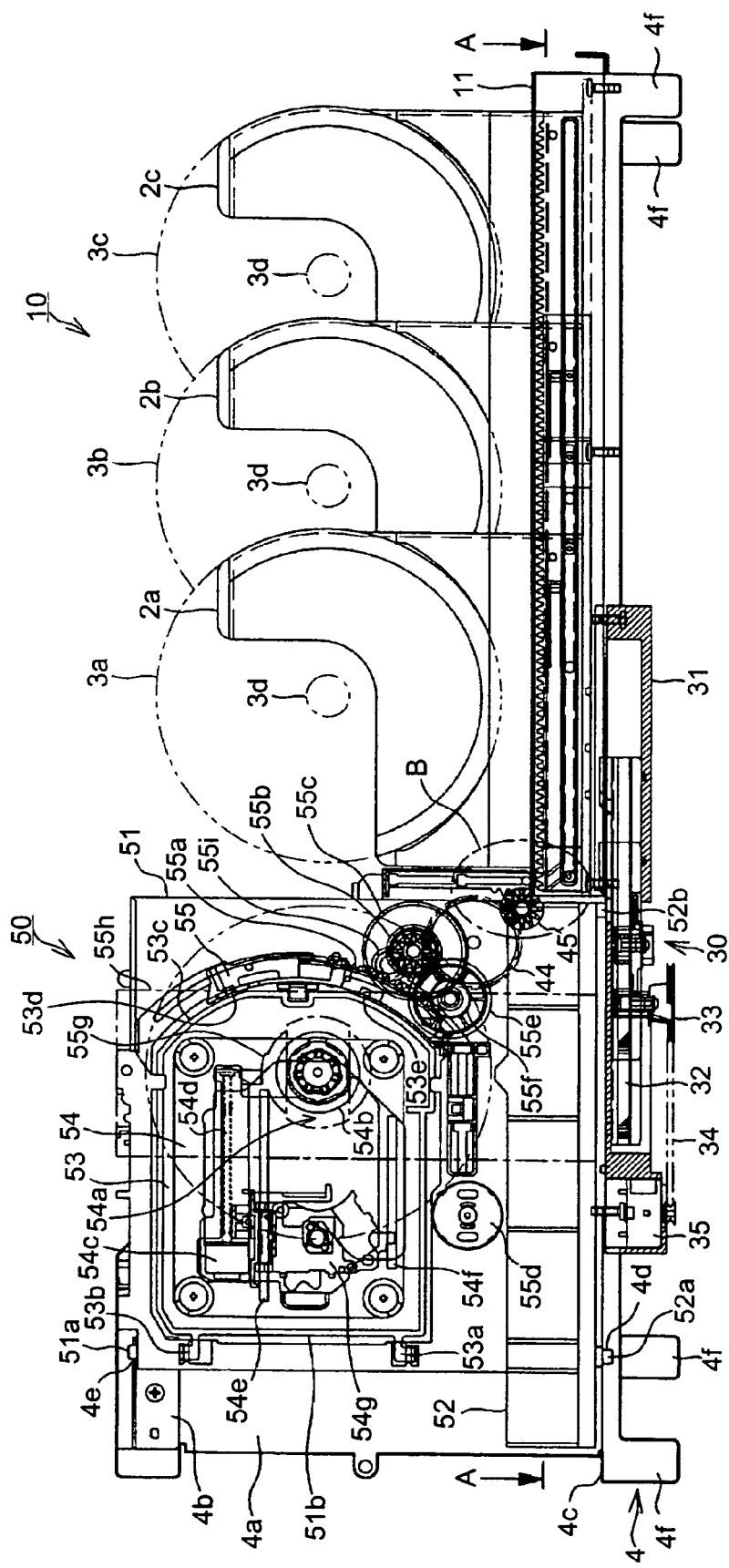
FIG. 2A is a partially exploded front view of the disk changer.
Figure 2B:
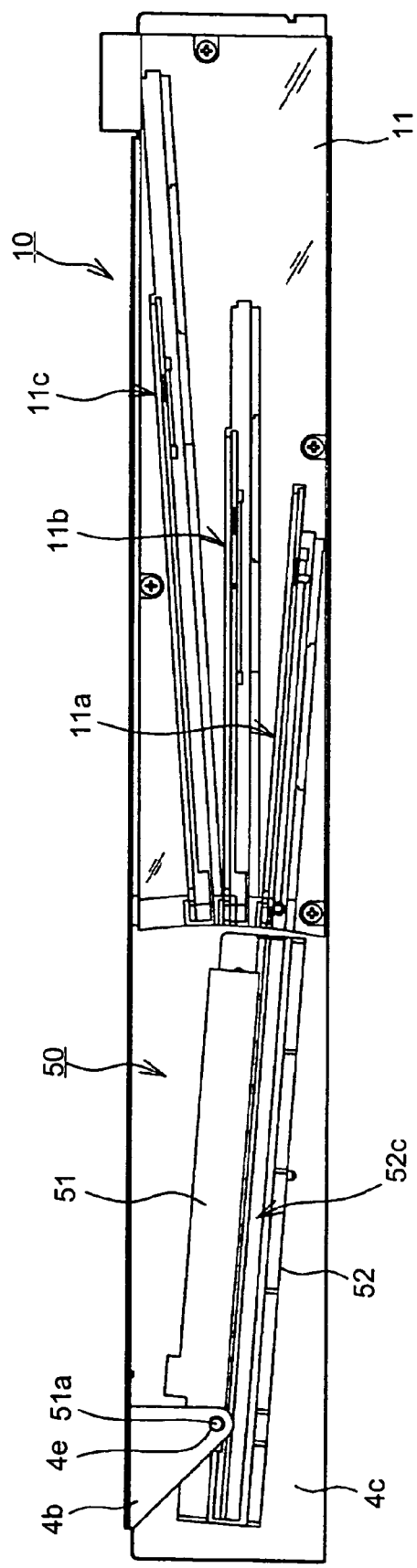
FIG. 2B is a plan view of the disk changer.
Figure 3A:
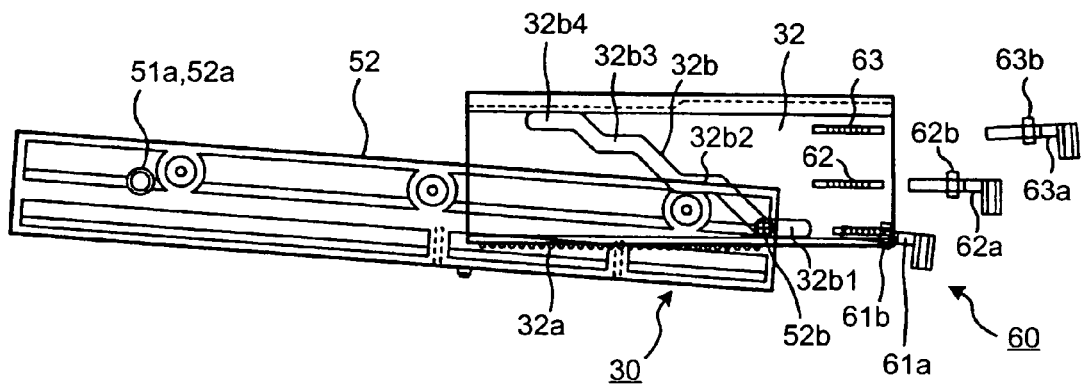
FIG. 3A is a plan view of a rotating mechanism.
Figure 3B:
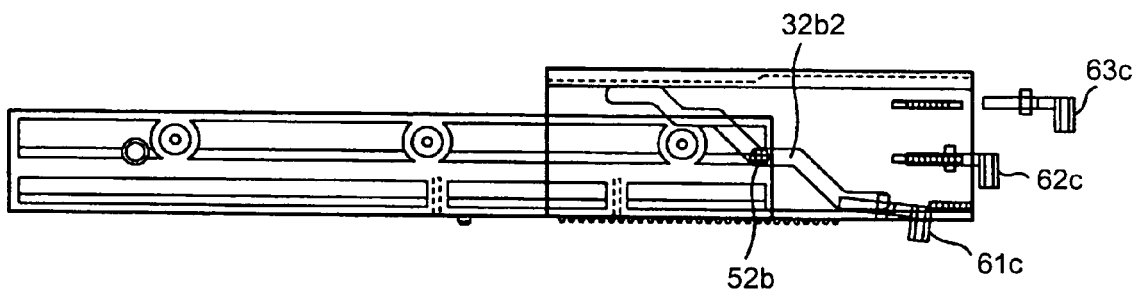
FIG. 3B is a plan view of the rotating mechanism.
Figure 3C:
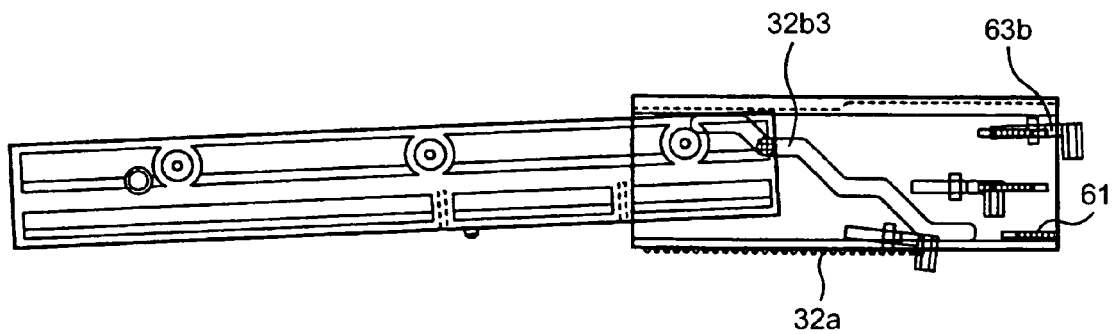
FIG. 3C is a plan view of the rotating mechanism.
Figure 3D:
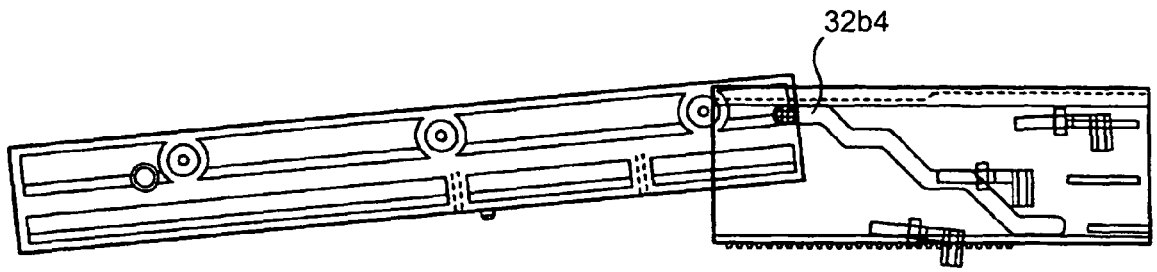
FIG. 3D is a plan view of the rotating mechanism.
Figure 4A:
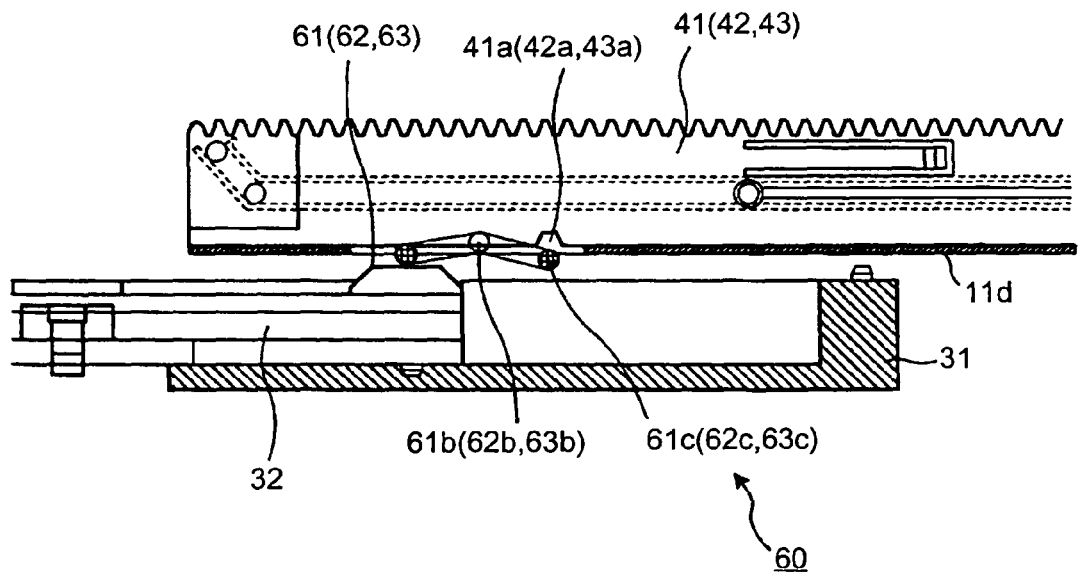
FIG. 4A is a front view of a tray lock mechanism.
Figure 4B:
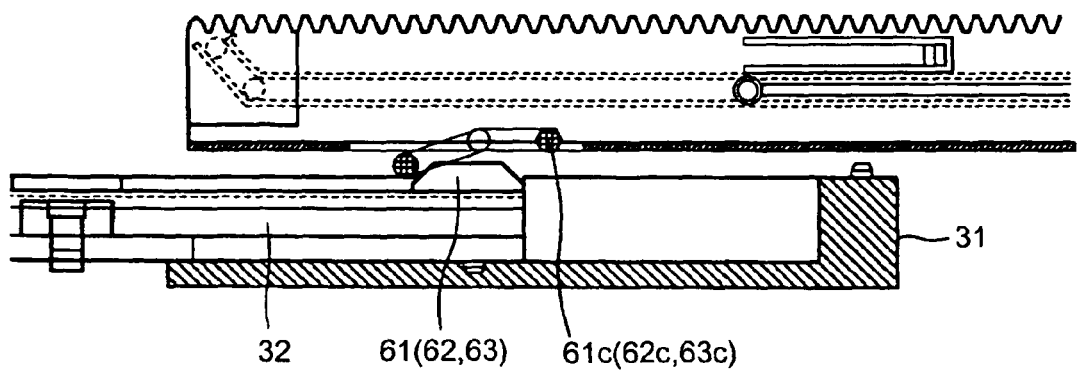
FIG. 4B is a front view of the tray lock mechanism.

FIG. 1A is a front view of a cabinet of a disk changer according to an embodiment of the present invention; FIG. 1B is a right side view of the cabinet; FIG. 2A is a partially exploded front view of the disk changer from which the cabinet has been removed; FIG. 2B is a plan view of the disk changer from which the cabinet has been removed; FIG. 3A is a plan view of a rotating mechanism depicting a state that a first disk tray 2a has been selected; FIG. 3B is a plan view of a rotating mechanism depicting a state that a second disk tray 2b has been selected; FIG. 3C is a plan view of the rotating mechanism depicting a state that a third disk tray 2c has been selected; FIG. 3D is a plan view of the rotating mechanism depicting a state that all disk trays have been locked; FIG. 4A is a front view of a lock mechanism depicting a state that the first disk tray 2a has been selected and unlocked; and FIG. 4B is a front view of the lock mechanism depicting a state that another disk tray has been selected and the disk tray 2a has been locked.

A cabinet 1 is formed in a horizontally long rectangular parallelepiped shape with a short depth, a disk accommodating unit 10 is provided on a right side, and a disk reproducing unit 50, described later, is accommodated on a left portion of the cabinet 1 adjacent to the disk accommodating unit 10. The disk accommodating unit 10 is opened at its top portion and a front face portion, and first, second, and third disks 3a, 3b, and 3c can be taken in and out of disk trays 2a, 2b, and 2c serving as first, second, and third accommodating means of the disk accommodating unit 10. An opening and closing cover 1c made from transparent resin or semi-transparent resin in an L shape in a side view is attached to an opening via a hinge to pivot upwardly. Since the opening and closing cover 1c is transparent or semi-transparent, a user can see the accommodated disks 3a, 3b, and 3c even if the cover is closed.

As shown in FIG. 2A and FIG. 2B, the disk trays 2a, 2b, and 2c are vertical trays that hold the disks 3a, 3b, and 3c in a vertically lying manner, and lower ends thereof are accommodated in first holding groove 11a, second holding groove lib, and third holding groove 11c arranged and formed radially in a tray holder 11 installed in the disk accommodating unit 10, serving as radial lines, so that the disk trays are arranged radially. The disk trays 2b and 2c accommodated in a back side are accommodated and arranged while being shifted rightward of the disk trays 2a and 2b accommodated at front side predetermined positions (in a direction parallel to or substantially parallel to a disk face). According to the present embodiment, the disk trays are accommodated and arranged such that center holes 3d of the disks 3b and 3c held in the disk trays 2b and 2c accommodated in the back side do not overlap with the disks 3a and 3b held in the disk trays 2a and 2b accommodated in the front side.

By shifting the disk trays 2b and 2c accommodated in the back side from the disk trays 2a and 2b accommodated in the front side in a direction parallel or substantially parallel to a disk face, label faces of the disks 3b and 3c accommodated in the back side can be seen and the accommodated disks can be confirmed. By accommodating the disk trays such that the center holes 3d of the disks 3b and 3c held in the disk trays 2b and 2c accommodated in the back side do not overlap with the disks 3a and 3b held in the disk trays 2a and 2b accommodated and arranged on the front side, most part of the labels can be seen, and also a finger can be inserted into the center holes 3d from the front sides of the disks 3b and 3c, so that a disk can be attached to and detached from the disk tray without touching a face on which data is written, on a back side of the disk. Since the disk trays 2a, 2b, and 2c are made from transparent resin or semi-transparent resin, a label face on the far side of the disk trays 2a and 2b can also be seen.

A power source switch 1e, a light receiver if of a remote controller, a play/pause switch 1g, a stop switch 1h, and a display device lm for displaying a disk number, a track number during reproduction, a reproduction elapsing time, and the like are provided on a front panel 1d of the cabinet 1.

Three disk selecting switches 1i, 1j, and 1k serving as selecting units, for selecting and reproducing one of the disks 3a, 3b, and 3c held in each of the disk trays 2a, 2b, and 2c are provided on the front panel 1d positioned near just below the respective disk trays. The disk selecting switches correspond one-to-one to the each of the disk trays 2a, 2b, and 2c being accommodated and arranged. By thus providing the disk selecting switches 1i, 1j, and 1k, the user can press, without mistake, one of the disk selecting switches 1i, 1j, and 1k corresponding to one of the disks 3a, 3b, and 3c selected according to its label.

The disk reproducing unit 50 will be explained next with reference to FIG. 2A and FIG. 2B. A base stand 4 including a top board 4c, four legs 4f, and a standing plate 4a provided on a left side in a front view are disposed within the cabinet 1. A bracket 4b is attached to an upper portion of the standing plate 4a, and shaft holes 4d and 4e are provided in a left portion of the top board 4c and the bracket 4b, respectively. A tray guide 52 formed with a guide groove 52c that guides the disk trays 2a, 2b, and 2c to a position just before the disk reproducing unit 50 during loading of a disk is attached to a lower portion of a chassis 51 which is formed in a rectangular shape in a front view of the disk reproducing unit 50. Supporting shafts 52a and 51a are provided on a left and lower portion of the tray guide 52 and a left upper portion of the chassis 51. The supporting shafts 52a and 51a are fitted into the shaft holes 4d and 4e, so that the chassis 51 and the tray guide 52 are integrally and pivotally supported about the supporting shafts 52a and 51a. Positions of the supporting shafts 52a and 51a on a plan view are not necessarily at an intersection of extended lines of the first holding groove 11a, the second holding groove 11b, and the third holding groove 11c as radial lines, and they can be spaced from the extended lines.

A horizontally long D-shaped float base 53 in a front view is provided in a hollow portion 51b of the chassis 51. The float base 53 is pivotally supported to the chassis 51 via pivoting shafts 53a and 53b provided at the left end thereof, to be pivoted in front and rear directions.

A disk reproduction unit 54 is attached to the float base 53. The disk reproduction unit 54 includes a disk table 54b driven by a spindle motor 54a and a pickup 54g that tracks on tracking shafts 54e and 54f by a screw shaft 54d driven by a stepping motor 54c to read data on a disk. The disk reproduction unit 54 is attached to the float base 53 such that a table face of the disk table 54b faces a front side.

A clamp cam 55 formed in an arc shape extending along an arc portion 53c of the float base 53 is attached rightward of the hollow portion 51b of the chassis 51 movably along the arc portion 53c. An arc-shaped rack 55a is formed on an outer periphery of the clamp cam 55, and an intermediate small gear 55i meshing with the arc-shaped rack 55a is provided on the chassis 51. The chassis 51 includes a gear 55c having a small gear 55b meshing with the intermediate small gear 55i. The gear 55c is driven through meshing thereof with a small gear 55f of a pulley 55e belt-driven by a motor 55d provided at a lower portion of the chassis 51 so that the clamp cam 55 is driven via a gear train. A cam groove whose upper portion is inclined rearward as seen from a side is formed on the clamp cam 55, and cam pins 53d and 53e provided on a right end of the float base 53 are fitted in the cam groove, so that, when the clamp cam 55 is driven by the gear 55c downwardly from a state shown in FIG. 2A, the float base 53 is pivoted forward about the pivoting shafts 53a and 53b.

A tray drawing pinion 45 that meshes with a tray drawing rack described later to retract the tray drawing track toward the disk reproducing unit 50 and that loads the disk trays 2a, 2b, and 2c to a position opposing to the disk reproducing unit 50 is provided at an end portion of the disk accommodating unit 10 of the chassis 51 (the disk reproducing unit 50). The tray drawing pinion 45 is driven by an intermediate gear 44 meshing with the small gear 55b.

A clamper supporting plate 55h supporting a clamper 55g is provided so as to connect an upper portion of the chassis 51 and the tray guide 52 such that a clearance through which the disk trays 2a, 2b, and 2c can pass is provided between the front face of the chassis 51 and the clamper supporting plate 55h. The clamper 55g holds down the disk 3a, 3b, or 3c at its front portion and receives advancement of the disk table 54b due to pivoting of the float base 53, to clamp the disk 3a, 3b, or 3c on the disk table 54b. The clamper 55g is rotated together with the disk table 54b and a clamped disk.

The rotating mechanism and the tray lock mechanism of the disk reproducing unit 50 will be explained next with reference to FIG. 2A, FIG. 3A to FIG. 3D, FIG. 4A, and FIG. 4B. The rotating mechanism 30 includes a holding frame 31 attached to a lower side of the top board 4c of the base stand 4, a selecting cam 32 with a rectangular shape in a plan view that is held by the holding frame 31 so as to be movable leftward and rightward, a pulley 33 that is held on the holding frame 31 and has a pinion meshing with a rack 32a formed on the selecting cam 32 to move the selecting cam 32 leftward and rightward, and a motor 35 that is held on the holding frame 31 and drives the pulley 33 via a belt 34.

A cam groove 32b is formed stepwise in the selecting cam 32, and a cam pin 52b provided at a right lower end of the tray guide 52 is fitted into the cam groove 32b, so that, when the selecting cam 32 moves from left to right, the disk reproducing unit 50 is pivoted about the supporting shafts 52a and 51a from front to back. When the cam pin 52b is positioned inside a first cam groove 32b1, the selecting cam 32 selects the first disk tray 2a and positions the guide groove 52c of the tray guide 52 on an extended line of the holding groove 11a of the tray holder 11. When the cam pin 52b is positioned inside a second cam groove 32b2, the selecting cam 32 selects the second disk tray 2b and positions the guide groove 52c of the tray guide 52 on an extended line of the holding groove 11b of the tray holder 11. When the cam pin 52b is positioned inside a third cam groove 32b3, the selecting cam 32 selects the third disk tray 2c and positions the guide groove 52c of the tray guide 52 on an extended line of the holding groove 11c of the tray holder 11. When the cam pin 52b is positioned inside a fourth cam groove 32b4, the selecting cam 32 is positioned at an all-lock position at which movement of all the trays is locked.

When the cam pin 52b is positioned inside the cam groove inclined to the moving direction except for the first to the fourth cam grooves, the disk reproducing unit 50 is pivoted from front to back about the supporting shafts 52a and 51a according to movement of the selecting cam 32 from left to right.

The tray lock mechanism 60 will be explained next. Cam plates 61, 62, and 63 with a trapezoidal shape in a front view corresponding to each of the disk trays 2a, 2b, and 2c are provided on a right upper face of the selecting cam 32. Lock levers 61a, 62a, and 63a with an "L" shape in a front view serving as locking units are supported pivotally about pivoting shafts 61b, 62b, and 63b on a bottom plate 11d of the tray holder 11 that is provided on the top board 4c of the base stand 4 positioned on the disk accommodating unit 10 and holds the disk trays 2a, 2b, and 2c during accommodation. The lock levers 61a, 62a, and 63a are biased in a counterclockwise direction in a front view by leaf springs (not shown) attached to the bottom plate 11d, and respective lock pins 61c, 62c, and 63c are normally engaged with notches 41a, 42a, and 43a formed on lower edges of first, second, and third rack plates 41, 42, and 43, described later, attached to the first, the second, and the third disk trays 2a, 2b, and 2c slide-moving on the bottom plate 11d of the tray holder 11, so that movement of the disk trays 2a, 2b, and 2c are locked.

As shown in FIG. 3A, when the cam pin 52b is positioned within the cam groove 32b1, the disk reproducing unit 50 is positioned to face the first disk tray 2a. At that time, the cam plate 61 presses up a left end of the lock lever 61a to disengage the notch 41a and the lock pin 61c from each other to unlock the first disk tray 2a, thereby allowing loading of the first disk tray 2a to a position of the disk reproducing unit 50.

As shown in FIG. 3B, when the cam pin 52b is positioned within the cam groove 32b2, the disk reproducing unit 50 is positioned to face the second disk tray 2b. At that time, the cam plate 62 presses up a left end of the lock lever 62a to disengage the notch 42a and the lock pin 62c from each other to unlock the second disk tray 2b, thereby allowing loading of the second disk tray 2b to the position of the disk reproducing unit 50.

As shown in FIG. 3C, when the cam pin 52b is positioned within the cam groove 32b3, the disk reproducing unit 50 is positioned to face the third disk tray 2c. At that time, the cam plate 63 presses up a left end of the lock lever 63a to disengage the notch 43a and the lock pin 63c from each other to unlock the third disk tray 2c, thereby allowing loading of the third disk tray 2c to the position of the disk reproducing unit 50. By thus locking movement of a disk which has not been selected, the disks and the disk trays can be protected during an operation of the disk changer.

As shown in FIG. 3D, when the cam pin 52b is positioned within the lock groove 32b4, the disk reproducing unit 50 is positioned at a lock position where movement of all of the disk trays 2a, 2b, and 2c are locked. At that time, all the cam plates 61, 62, and 63 are released from the left ends of all the lock levers 61a, 62a, and 62c, and all the notches 41a, 42a and 43a and all the lock pins 61c, 62c, and 63c are engaged with each other, so that movement of all of the disk trays 2a, 2b, and 2c are locked. By thus locking movement of all the disk trays, the disks and the disk trays can be protected during transportation of the disk changer.

Since the lock groove 32b4 for locking movement of all of the disk trays 2a, 2b, and 2c is provided in the cam groove 32b, all of the disk trays 2a, 2b, and 2c are locked by positioning the cam pin 52b in the lock groove 32b4 during product transportation and the like, so that adverse influence such as damage of a disk tray itself or damage to surrounding parts due to movement during transportation can be prevented.

Figure 5A:
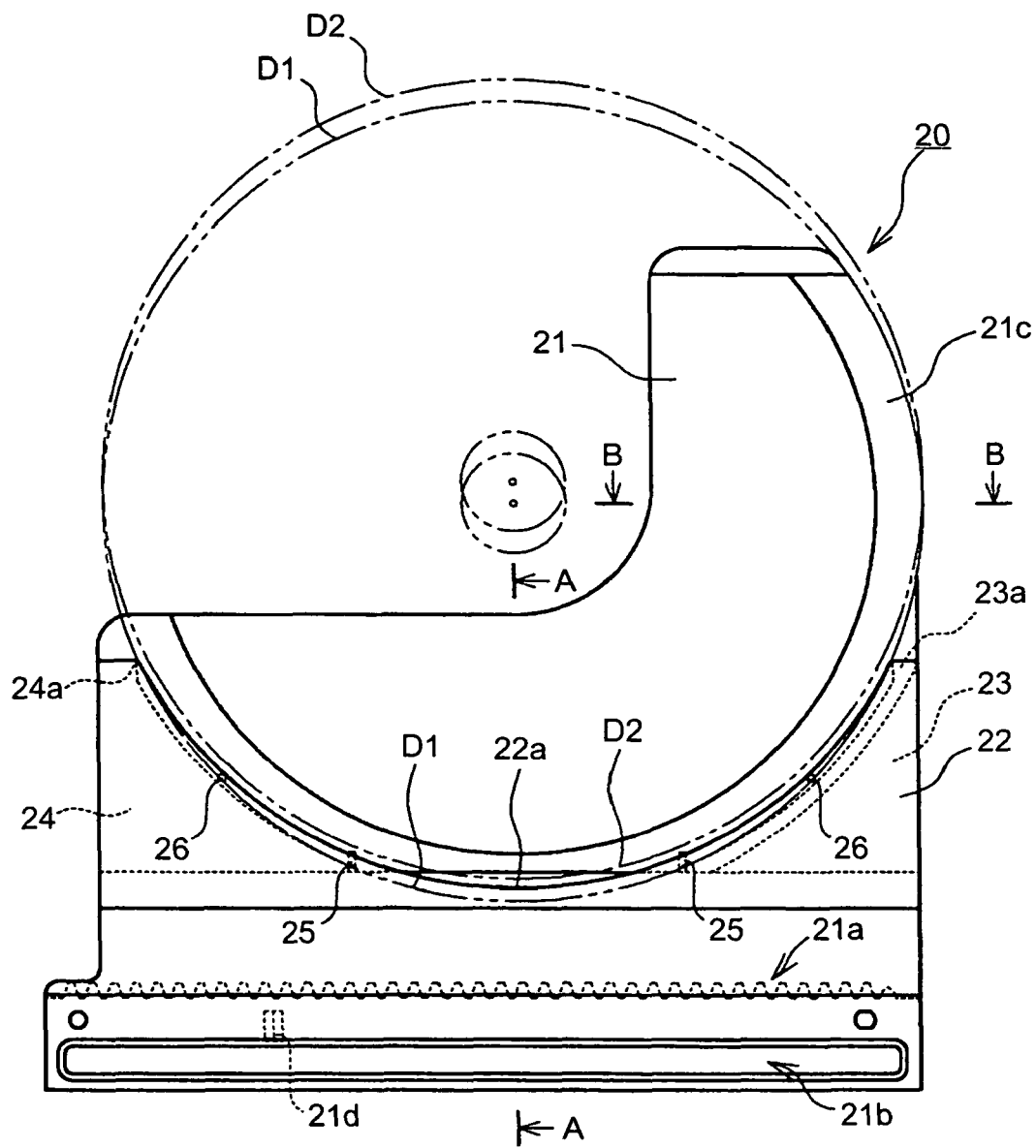
FIG. 5A is a front view of a vertical disk tray.
Figure 5B:
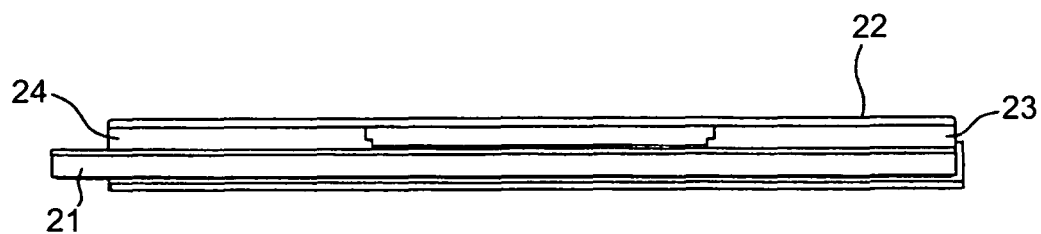
FIG. 5B is a bottom view of the vertical disk tray.
Figure 5C:
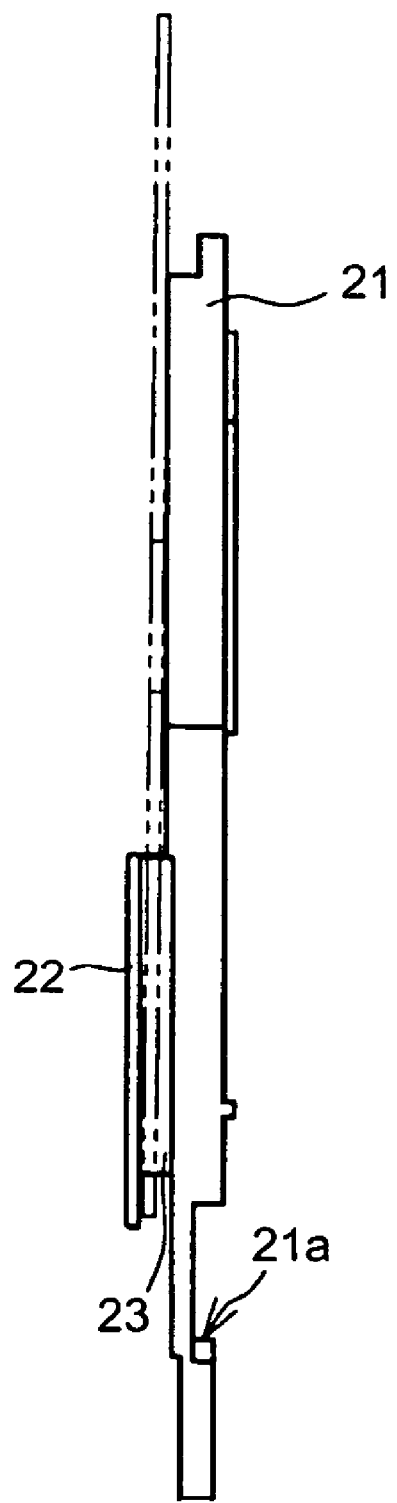
FIG. 5C is a right side view of the vertical disk tray.
Figure 5D:
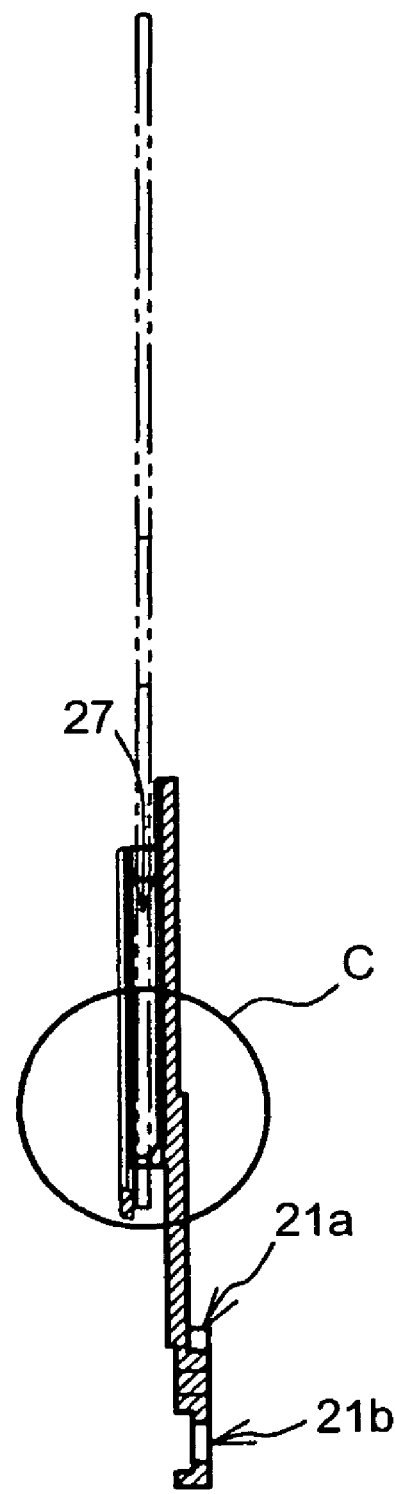
FIG. 5D is a cross section of the vertical disk tray, taken along a line A-A shown in FIG. 5A.
Figure 5E:
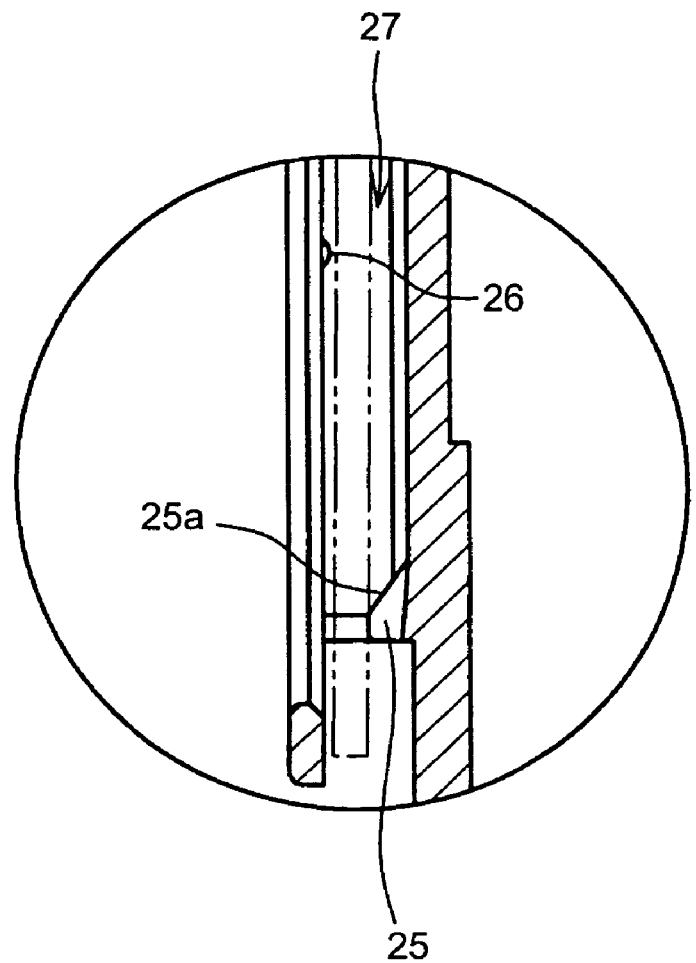
FIG. 5E is an enlarged view of a portion C of the vertical disk tray in FIG. 5D.
Figure 5F:
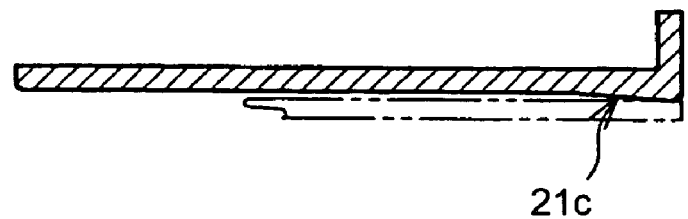
FIG. 5F is a cross section of the vertical disk tray, taken along a line B-B shown in FIG. 5A.

A structure of a vertical tray will be explained next with reference to FIG. 5A to FIG. 5F. FIG. 5A is a front view of the vertical tray; FIG. 5B is a bottom view of the vertical tray; FIG. 5C is a right side view of the vertical tray; FIG. 5D is a cross section of the vertical tray, taken along a line A-A shown in FIG. 5A; FIG. 5E is an enlarged view of a portion C of the vertical tray shown in FIG. 5D; and FIG. 5F is a cross section of the vertical tray, taken along a line B-B shown in FIG. 5A.

In the above explanation, while the disk trays are explained as the first, the second, and the third disk trays 2a, 2b, and 2c corresponding to the first, the second, and the third disks 3a, 3b, and 3c, since shapes of the first, the second, and the third disk trays 2a, 2b, and 2c are the same, these trays are collectively explained below as a vertical tray 20.

The vertical tray 20 includes a back plate 21 that faces a back face (data face) of a disk to be held and supports the disk, a front plate 22 that is fixed on a lower front side of the back plate 21 via a clearance 27 larger than a thickness of the disk, whose upper edge 22a is formed in an arc shape facing downwardly, and that overlaps with a lower outer periphery of the disk accommodated in the clearance 27 at the upper edge 22a, and supports the disk from a label face side thereof, and disk supporting members 23 and 24 that are arranged between the back plate 21 and the front plate 22 to connect therebetween, and support the disk from the lower side in a vertical direction. The back plate 21 and the front plate 22 constitute disk holding faces.

The back plate 21 has a face that faces a lower portion positioned below a disk center and a right side portion of a back face of the accommodated disk but does not have a face that faces another portion of the back face. A tray rack 21a for loading the vertical tray 20 to a position of the disk reproducing unit 50 is formed on a lower back face of the back plate 21, an elongated mounting hole 21b for mounting first, second, and third rack plates, described later, is formed on a lower side of the tray rack 21a, and a recess 21d engaging with a locking unit of the rack plate is formed on an upper left side of the mounting hole 21b. An arc-shaped strip portion 21c facing an outer periphery of a back face of an accommodated disk is formed in an inclined face (becoming higher) approaching to the disk as it approaches to an outer periphery thereof, and when a disk is accommodated, only an outermost periphery of the back face of the disk contacts with the back plate 21 while a data region at the inner side of the outermost periphery of the disk is put in a floating state from the back plate 21, so that the data region is prevented from being damaged due to contact with the back plate 21.

The disk supporting member 23 is formed in an arc piece shape, and it is disposed in the clearance 27 between the front plate 22 and the back plate 21 along a right portion of the arc-shaped upper edge 22a of the front plate 22. The disk supporting member 24 is formed in a triangle plate shape and it is disposed in the clearance 27 between the front plate 22 and the back plate 21 such that one side of the disk supporting member 24 extends along a left portion of the arc-shaped upper edge 22a of the front plate 22. Edge portions 23a and 24a serving as disk supporting portions and abutting on lower left and right portions of an outer peripheral edge of an accommodated disk, the lower and right portions being positioned below a center position of the accommodated disk, to support the disk vertically are formed on upper end inner portions of the disk supporting members 23 and 24. The edge portions 23a and 24a support a disk by having an outer peripheral edge of the disk placed thereon.

FIG. 5A depicts height positions of a disk D1 put during accommodation thereof in the vertical tray 20 and of a disk D2 which has been clamped by the disk table 54b during reproduction. The downward arc-shaped upper edge 22a of the front plate 22 overlaps with a lower outer periphery of the disk D1 during accommodation and it is formed in an arc shape approximately concentric to an outer peripheral edge of the disk during reproduction such that it is equally spaced from the outer peripheral edge of the disk D2 clamped and moved upwardly during the reproduction.

An upward inclined face 25a and two left and right projections 25 and 25 for guiding the lower outer periphery of the accommodated disk D1 to approach to the front plate 22 are provided on an outer periphery of the arc-shaped strip portion 21c of the back plate 21 positioned below the edge portions 23a and 24a serving as two left and right disk supporting portions.

Two projections 26 and 26 for pushing the lower outer periphery of the accommodated disk D1 toward the back plate 21 to incline the disk D1 backward are provided on left and right portions of the back face of the front plate 22 positioned below the edge portions 23a and 24a, positioned above the projections 25 and 25, and positioned near the upper edge 22a. With the above configuration, the vertical tray 20 holds the disk D1 such that the disk is put vertically and inclined backward. By holding the disk D1 in a backward inclined state, even if the vertical tray 20 is vibrated in front and rear directions, the disk D1 will not tilt forward to drop off from the vertical tray 20.

Figure 6A:
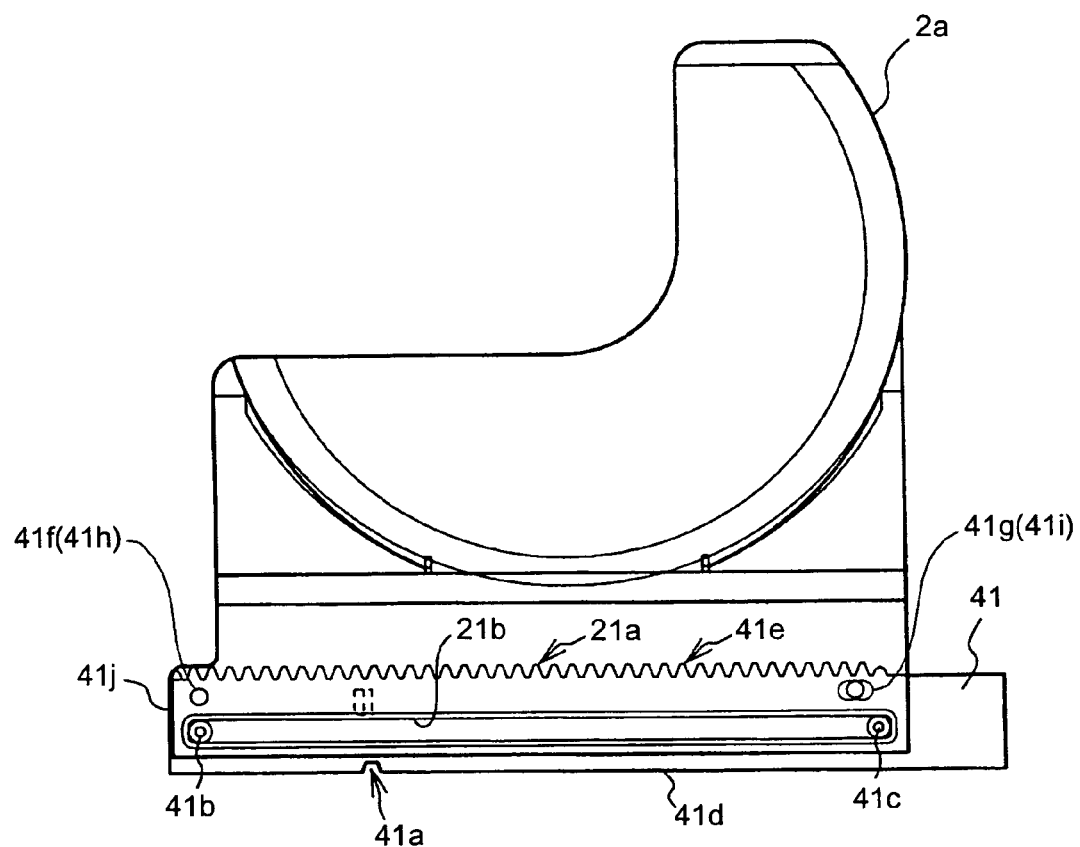
FIG. 6A is a front view of a first disk tray.
Figure 6B:
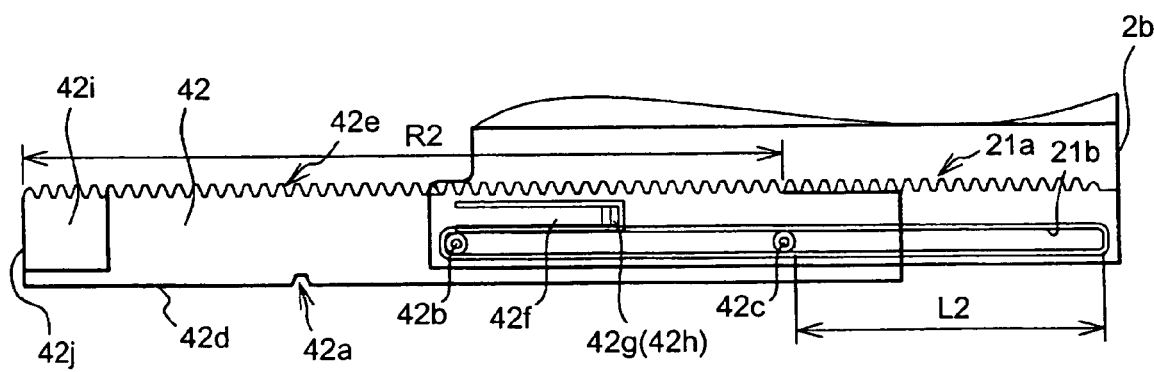
FIG. 6B is a partially exploded front view of a second disk tray.
Figure 6C:
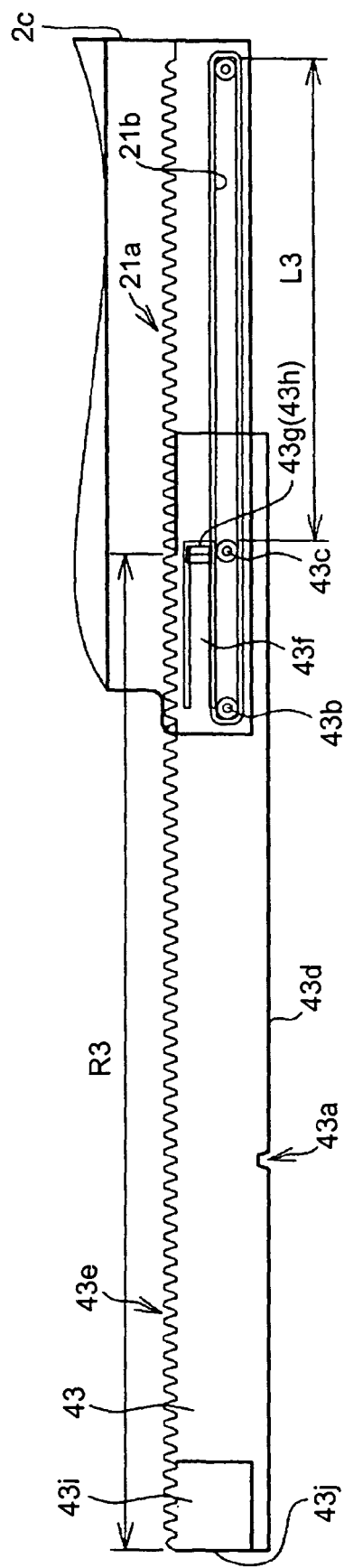
FIG. 6C is a partially exploded front view of a third disk tray.

The loading mechanism for a disk will be explained next with reference to FIG. 6A to FIG. 6C, FIG. 7A to FIG. 7E, and FIG. 8A to FIG. 8E. FIG. 6A is a front view of a first disk tray including a first rack plate; FIG. 6B is a partially exploded front view of a second disk tray including a second rack plate; FIG. 6C is a partially exploded front view of a third disk tray including a third rack plate; FIG. 7A to FIG. 7E are enlarged views of a portion B in FIG. 2A depicting actuating steps of an actuating cam mechanism for starting loading; and FIG. 8A to FIG. 8E are cross sections taken along a line A-A shown in FIG. 2A depicting loading steps of the third disk tray including the third rack plate.

The laterally elongated rectangular plate-shaped first rack plate 41 is mounted on a back face of a lower portion of the first disk tray 2a held in the first holding groove 11a of the tray holder 11 by inserting two mounting pins 41b and 41c into the mounting hole 21b of the disk tray 2a. A lower edge 41d of the rack plate 41 is positioned below the lower edge of the disk tray 2a and the lower edge 41d is supported on the bottom plate 11d of the tray holder 11, so that the disk tray 2a attached with the rack plate 41 slides and moves on the bottom plate 11d along the holding groove 11a.

The notch 41a is formed on the lower edge 41d of the rack plate 41, and the lock pin 61c of the lock lever 61a is engaged with the notch 41a. A first tray drawing rack 41e is formed on an upper edge of the first rack plate 41, and the first tray drawing rack 41e is formed such that a length and a height thereof completely conform to those of the tray rack 21a. A left end portion 41i of the first rack plate 41 is positioned to conform to a left end portion of the disk tray 2a and a right end portion thereof projects rightward from a right end portion of the disk tray 2a. The two mounting pins 41b and 41c of the first rack plate 41 are positioned at left and right ends of the mounting hole 21b of the disk tray 2a, respectively. A circular hole 41f is provided above a left end of the mounting hole 21b, and an elongated hole 41g is provided above a right end of the mounting hole 21b. Pins 41h and 41i fitted into the circular hole 41f and the elongated hole 41g, respectively, are provided in the first rack plate 41. The pin 41h is fitted into the circular hole 41f and the pin 41h is fitted into the elongated hole 41g so that the first rack plate 41 is fixed so as not to extend and retract leftward and rightward with respect to the disk tray 2a. Thus, since the disk tray 2a and the rack plate 41 do not extend and retract, it is unnecessary to manufacture them as separate members so that the disk tray 2a and the rack plate 41 can be formed as a single disk tray 2a integrally.

The laterally elongated rectangular plate-shaped second rack plate 42 is mounted on a back face of a lower portion of the second disk tray 2b held in the second holding groove 11b of the tray holder 11 by inserting two mounting pins 42b and 42c into the mounting hole 21b of the disk tray 2b. A lower edge 42d of the rack plate 42 is positioned below the lower edge of the disk tray 2b and the lower edge 42d is supported on the bottom plate lid of the tray holder 11, so that the disk tray 2b attached with the rack plate 42 slides and moves on the bottom plate 11d along the holding groove 11b.

The notch 42a is formed on the lower edge 42d of the rack plate 42, and the lock pin 62c of the lock lever 62a is engaged with the notch 42a. A second tray drawing rack 42e is formed on an upper edge of the second rack plate 42, and the second tray drawing rack 42e is formed such that a height shape thereof conforms to that of the tray rack 21a. The second rack plate 42 can extend and retract leftward and rightward with respect to the disk tray 2b, and it extends and retracts by a distance L2 from the maximum extended state shown in FIG. 6B where the mounting pin 42b is positioned at the left end position of the mounting hole 21b to a position where the mounting pin 42c reaches the right end position of the mounting hole 21b. The second tray drawing rack 42e is formed from the left end portion 42j of the rack plate 42 to a length of R2.

When the second rack plate 42 is in the maximum extended state, approximately half length of the second rack plate 42 overlaps with the disk tray 2b. The second tray drawing rack 42e is formed from the left end portion 42j of the rack plate 42 to the length of R2, described later. A laterally elongated "U" shaped slit is formed near the right of center of the second rack plate 42, and an inner projection 42g and an outer projection 42h are formed on a front face and a back face of a distal end of a flexure piece 42f formed so as to be surrounded by the slit, respectively. The inner projection 42g is engaged with the recess 21d (see FIG. 8A) serving as a first recess provided in the disk tray 2b at the maximum extended position shown in FIG. 6B by a spring force of the flexure piece 42f. The inner projection 42g and the outer projection 42h constitute a locking unit. A rectangular rack plate 42i attached to a left end of the rack plate 42 is used for increasing the thickness of the rack plate 42 to prevent the rack plate 42 from rattling in the holding groove 11c or the guide groove 52c (see FIG. 8A).

A laterally elongated rectangular plate-shaped third rack plate 43 is mounted on a back face of a lower portion of the third disk tray 2c held in the third holding groove 11c of the tray holder 11 by inserting two mounting pins 43b and 43c into the mounting hole 21b of the disk tray 2c. A lower edge 43d of the rack plate 43 is positioned below the lower edge of the disk tray 2c and the lower edge 43d is supported on the bottom plate 11d of the tray holder 11, so that the disk tray 2c attached with the rack plate 43 slides and moves on the bottom plate 11d along the holding groove 11c. The notch 43a is formed at the lower edge 43d of the rack plate 43, and the lock pin 63c of the lock lever 63a engages with the notch 43a.

A third tray drawing rack 43e is formed on an upper edge of the third rack plate 43, and the third tray drawing rack 43e is formed such that a height shape thereof coincides with that of the tray rack 21a. The third rack plate 43 can extend and retract leftward and rightward with respect to the disk tray 2c, and extends and retracts by a distance L3 from the maximum extended state shown in FIG. 6C where the mounting pin 43b is positioned at the left end position of the mounting hole 21b to a position where the mounting pin 43c reaches the right end position of the mounting hole 21b. The third tray drawing rack 43e is formed from the left end portion 43j of the rack plate 43 to a length of R3, described later.

A laterally elongated "U"-shaped slit is formed on a right side of the third rack plate 43, and an inner projection 43g and an outer projection 43h are formed on front and back faces of a distal end of the flexure piece 43f formed so as to be surrounded by the slit, respectively. The inner projection 43g engages with the recess 21d serving as a first recess provided in the disk tray 2c at the maximum extended state shown in FIG. 6C by a spring force of the flexure piece 43f. The inner projection 43g and the outer projection 43h constitute a locking unit. A rectangular rack plate 43i attached at a left end of the rack plate 43 is used for increasing the thickness of the rack plate 43 to prevent the rack plate 43 from rattling in the holding groove 11c or the guide groove 52c (see FIG. 8A). Loading distances from the first, the second, and the third disk trays 2a, 2b, and 2c to the disk reproducing unit 50 are different.

Actuating steps of the actuating cam mechanism that starts loading of a disk will be explained next with reference to FIG. 7A to FIG. 7E. As shown in FIG. 2B, when the first, the second, and the third disk trays 2a, 2b, and 2c are respectively held in the first holding groove 11a, the second holding groove 11b, and the third holding groove 11c of the tray holder 11 and accommodated in the tray holder 11, left end portions 41j, 42j, and 43j of the rack plates 41, 42, and 43 are positioned at the left end portion of the tray holder 11, respectively.

When any one of the disk selecting switches 1i, 1j, and 1k is selected to be turned ON, the disk reproducing unit 50 is pivoted to position the guide groove 52c of the tray guide 52 on an extended line of selected one of the holding grooves 11a, 11b, and 11c of the tray holder 11. When the disk reproducing unit 50 is pivoted to position the tray drawing pinion 45 to face any one of the left end portions 41j, 42j, and 43j of the rack plates 41, 42, and 43, the tray drawing pinion 45 does not mesh with the tray drawing racks 41e, 42e, and 43e of the rack plates 41, 42, and 43 or the tray rack 21a.

The actuating cam mechanism 70 has a function of drawing the rack plate 41, 42, or 43, or the single disk tray 2a toward the disk reproducing unit 50 to cause it to mesh with the tray drawing pinion 45 at a loading start time of selected one of the disks 3a, 3b, and 3c.

The actuating cam mechanism 70 is provided at an end of the disk reproducing unit 50 near the disk accommodating unit 10, and includes an actuating rack 71a meshing with the tray drawing pinion 45, and a cam pin 71 moving downward (in a direction crossing a disk tray drawing direction) by rotation of the tray drawing pinion 45.

The actuating cam mechanism 70 includes a cam groove 72 having an opening 72a formed on a back side of the first, the second, and the third rack plates 41, 42, and 43 or the single disk tray 2a and formed above the left end portions 41j, 42j, and 43j, a right inclined groove 72b continuous to the opening 72a, and a horizontal groove 72c.

Figure 7A:
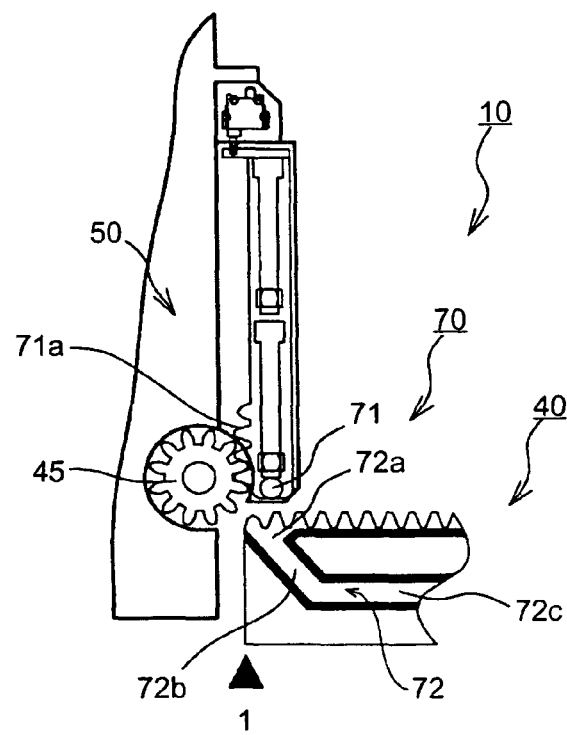
FIG. 7A is a schematic for illustrating an actuating step of an actuating cam mechanism.
Figure 7B:
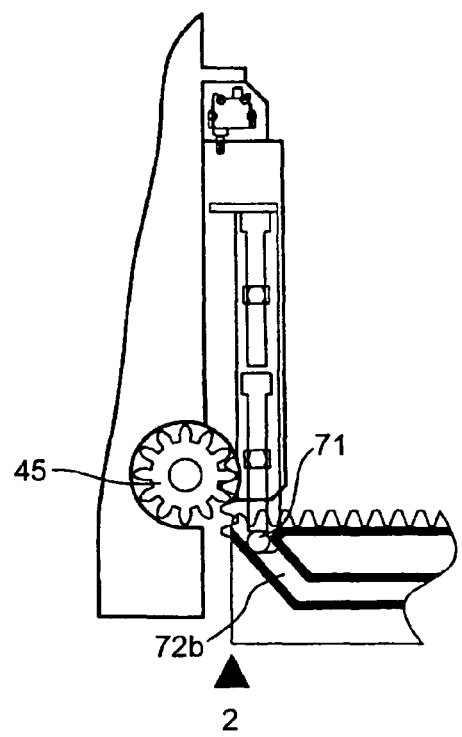
FIG. 7B is a schematic for illustrating the actuating step of the actuating cam mechanism.
Figure 7C:
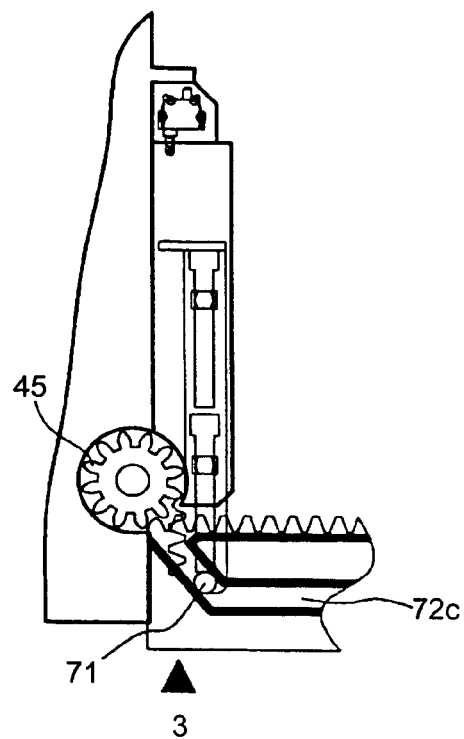
FIG. 7C is a schematic for illustrating the actuating step of the actuating cam mechanism.

The actuating steps of the actuating cam mechanism 70 that starts loading of a disk will be explained with reference to FIG. 7A to FIG. 7E. A first step shown in FIG. 7A is a standby state. At a second step shown in FIG. 7B, the actuating rack 71a is pressed down by rotation of the tray drawing pinion 45 so that the cam pin 71 engages with the opening 72a of the cam groove 72. At a third step shown in FIG. 7C, the cam pin 71 is further pressed down to move downward within the right inclined groove 72b and draw the rack plates 41, 42, and 43 leftward (toward the disk reproducing unit 50).

Figure 7D:
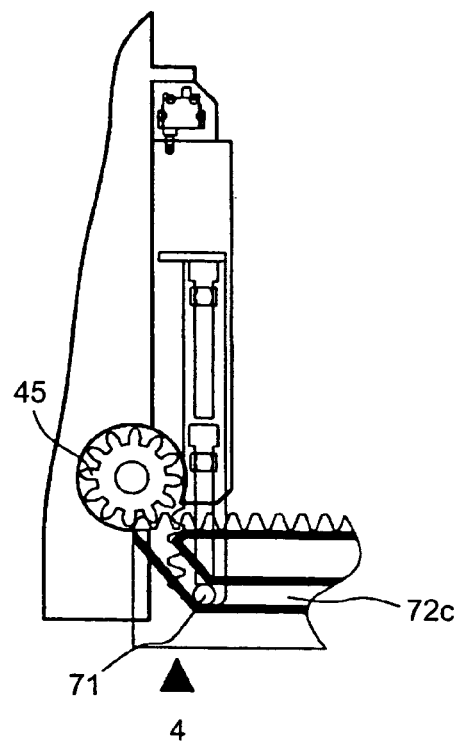
FIG. 7D is a schematic for illustrating the actuating step of the actuating cam mechanism.
Figure 7E:
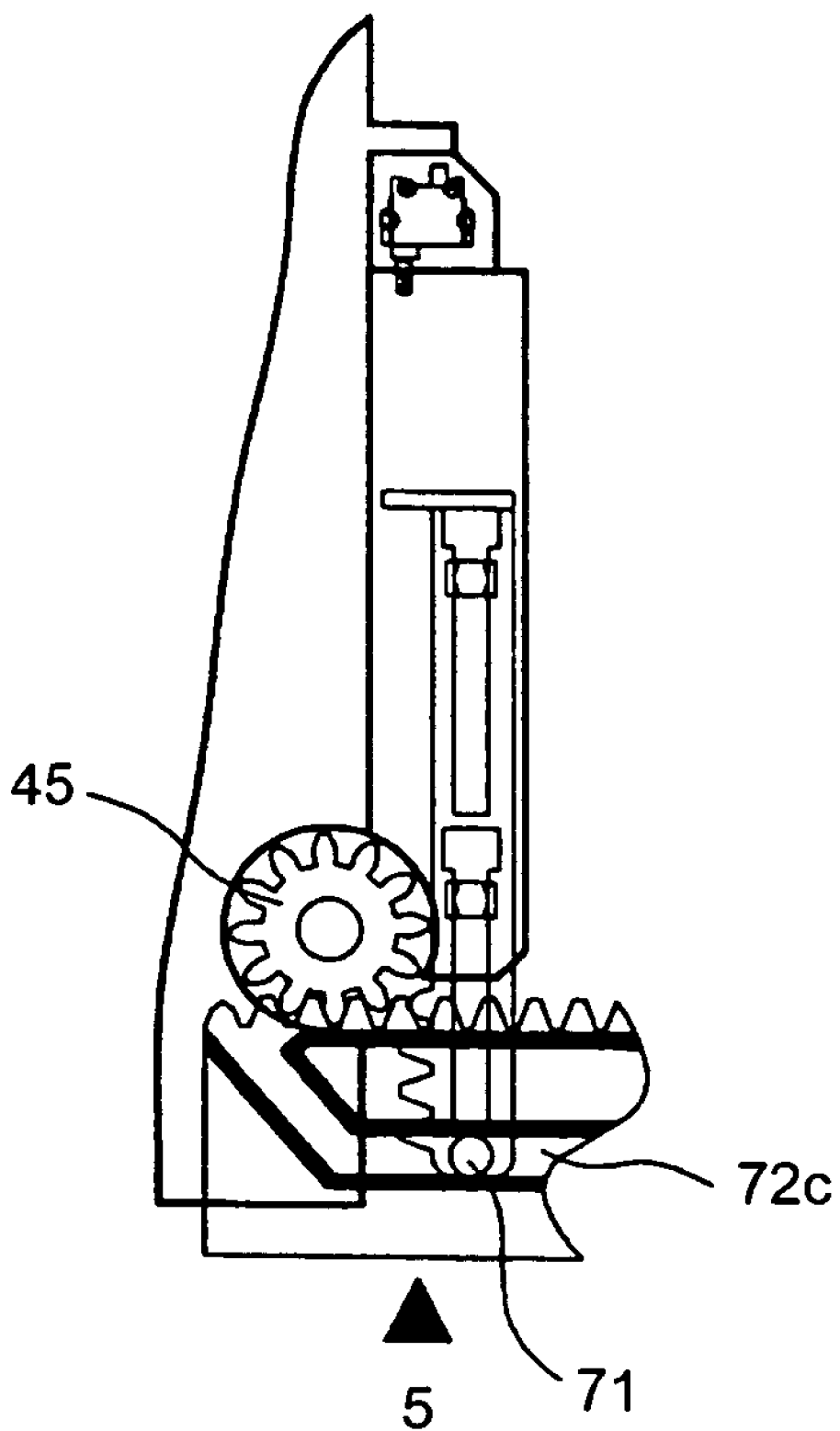
FIG. 7E depicts an actuating step of the actuating step of the actuating cam mechanism.

At a fourth step shown in FIG. 7D, when the cam pin 71 reaches the horizontal groove 72c, the tray drawing pinion 45 meshes with the tray drawing rack 41e, 42e, or 43e or the tray rack 21a and meshing between the actuating rack 71a and the tray drawing pinion 45 is released. At a fifth step shown in FIG. 7E, the tray drawing rack 41e, 42e, or 43e or the tray rack 21a is drawn in the disk reproducing unit 50 by the tray drawing pinion 45, and the cam pin 71 is relatively moved rightward within the horizontal groove 72c. Thus, the tray drawing pinion 45 and the tray drawing rack 41e, 42e, or 43e (the rack plate 41, 42, or 43) or the tray rack 21a that does not mesh with each other at a loading start time can be caused to mesh with each other by the actuating cam mechanism 70 without causing teeth of the pinion and teeth of the rack to strike against each other.

Figure 8A:
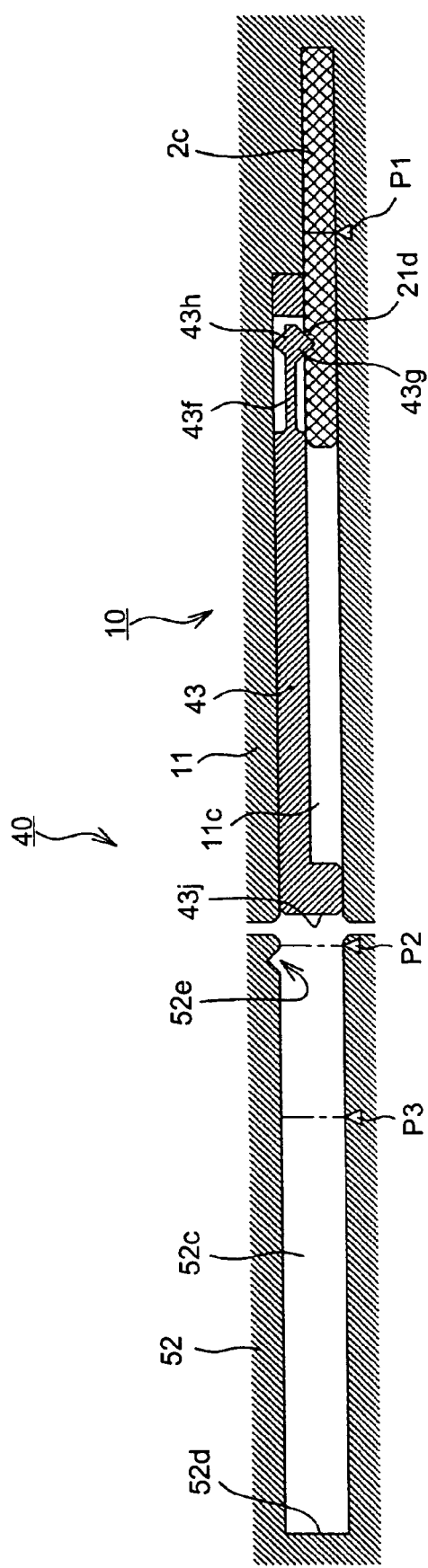
FIG. 8A is a schematic for illustrating a loading step of the third disk tray.
Figure 8B:
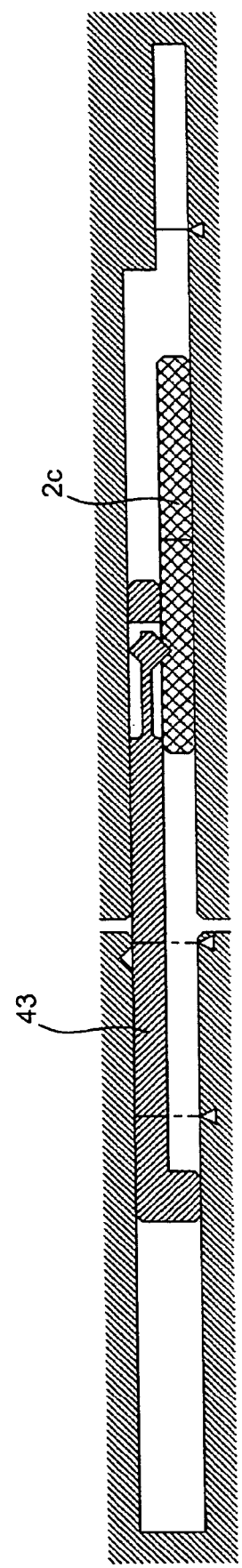
FIG. 8B is a schematic for illustrating the loading step of the third disk tray.

Loading steps of the third disk tray 2c including the third rack plate 43 will be explained next with reference to FIG. 8A to FIG. 8E. With reference to FIG. 8A, the third disk tray 2c attached with the third rack plate 43 is held in the third holding groove 11c of the tray holder 11 provided in the disk accommodating unit 10. The disk tray 2c and the rack plate 43 are locked in the maximum extended state by engagement of the inner projection 43g of the flexure piece 43f of the rack plate 43 with the recess 21d (the first recess) of the disk tray 2c.

The left end portion 43j of the rack plate 43 constitutes an abutting portion where it abuts on a stopper wall 52d serving as a stopper provided in the guide groove 52c of the tray guide 52 to stop movement of the rack plate 43, and it is positioned at a left end of the tray holder 11 during accommodation of the disk tray 2c. P1 indicates a disk center position during accommodation, P2 indicates a position of the tray drawing pinion 45, and P3 indicates a position of the disk table 54b, namely, the loading position.

The first step shown in FIG. 8A is a standby state. At the second step shown in FIG. 8B, the tray drawing rack 43e is drawn in the disk reproducing unit 50 by the tray drawing pinion 45 so that the rack plate 43 is moved leftward within the guide groove 52c and the disk tray 2c is conveyed. At the third step shown in FIG. 8C, the locking unit passes through a clearance between the tray holder 11 and the tray guide 52. At this time, since a spring force of the flexure piece 43f works and also the tray drawing pinion 45 is driven in a meshing state with both the rack 43e of the rack plate 43 and the tray rack 21a of the disk tray 2c, the rack plate 43 and the disk tray 2c will not move separately from each other due to disengagement of the inner projection 43g from the recess 21d.

At the fourth step shown in FIG. 8D, the left end portion 43j serving as an abutting portion of the rack plate 43 abuts on the stopper wall 52d serving as a stopper and the rack plate 43 stops. A distance R3 from the stopper wall 52d to a position of the tray drawing pinion 45 is set equal to the length R3 where the third rack 43e is formed from the left end portion 43j of the rack plate 43 shown in FIG. 6C. While the tray drawing rack 43e is disengaged from the tray drawing pinion 45 simultaneously with the abutment, the tray rack 21a of the disk tray 2c still meshes with the tray drawing pinion 45, thereby receiving a driving force from the pinion 45. The inner projection 43g serving as the locking unit is pushed out of the recess 21d serving as the first recess and the outer projection 43h serving as the locking unit is pushed into the recess 52e serving as the second recess and provided in the guide groove 52c, thereby unlocking the rack plate 43 from the disk tray 2c.

Figure 8E:
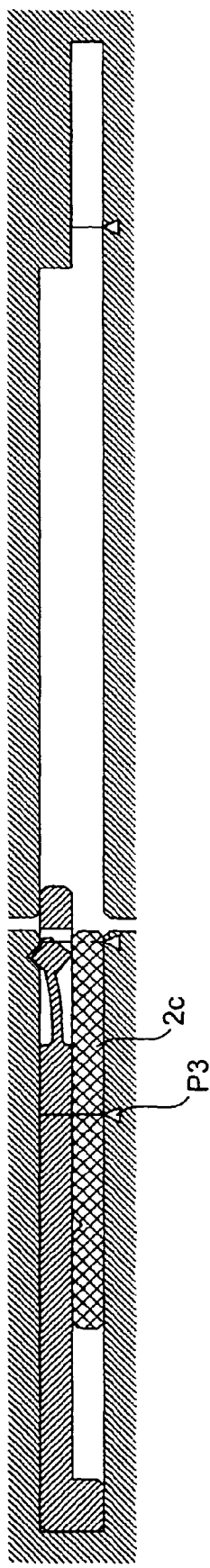
FIG. 8E is a schematic for illustrating the loading step of the third disk tray.

At the fifth step shown in FIG. 8E, only the disk tray 2c is conveyed leftward to the position of the disk table 54b, namely, the loading position P3. That is, the rack plate 43 draws the disk tray 2c in, in a first half process of loading and it stops in a second half process thereof for the tray rack 21a to continue the subsequent drawing. A movement distance L3 of only the disk tray 2c shown in FIG. 8D corresponds to an extending and retracting distance L3 of the rack plate 43 and the disk tray 2c shown in FIG. 6C.

Loading of the second disk tray 2b including the second rack plate 42 is performed by utilizing the cam pin 71 as a stopper and a terminal end of the horizontal groove 72c of the rack plate 42 as an abutting portion similarly to the third disk tray 2c. By reducing the size of means for moving the disk trays 2b and 2c to a position far from the disk reproducing unit 50 to perform loading at the far position as the laterally elongated rectangular plate-shaped rack plates 42 and 43 extendably and retractably attached to the disk trays 2b and 2c by utilizing sub-trays or the like, the disk changer can be reduced in size.

While the embodiment of the present invention has been explained above, the disk changer of the present invention is also applicable to a horizontal disk changer in which a disk is placed in a lying state, as well as to the vertical disk changer in which the disk is placed in a vertically standing state. The disk changer of the present invention is also applicable to a disk changer in which a disk reproducing unit is parallelly translated such as the one disclosed in Patent Document 1 (Japanese Patent Application Laid-Open No. 2000-100035).

The disk changer of the present invention is applicable to a data recording device that records data in a disk, as well as the disk reproducing device.

INDUSTRIAL APPLICABILITY

As described above, since the disk changer according to the present invention includes the lock mechanism that locks movement of a disk except for during reproduction from or recording in a disk, it is useful as a disk changer that can protect the disk regardless of during an operation or transportation.

The invention claimed is:

1. A disk changer comprising:
a disk accommodating unit that accommodates a plurality of disk trays, each of the disk trays holding one disk;
a disk processing unit that reproduces data from or records data to a loaded disk; and
a loading mechanism that loads a selected disk together with the disk tray from the disk accommodating unit to a position of the disk processing unit, wherein
the loading mechanism includes
  a tray drawing pinion provided in the disk processing unit;
  a disk tray that is accommodated in the disk accommodating unit and includes a tray rack engaged with the tray drawing pinion; and
  a rack plate that includes a tray drawing rack engaged with the tray drawing pinion, is extendably attached to the disk tray, draws a tray in at a first half process of the loading, and stops the tray at a second half process of the loading to relay a subsequent drawing to the tray rack, wherein
the disk processing unit includes
  a stopper that stops the rack plate at a position where the rack plate is drawn in by a predetermined distance; and
  a guide groove that guides loading of the rack plate and the disk tray,
a second recess is formed near a rack plate inlet of the guide groove,
a first recess is formed on the disk tray, and
the rack plate includes
  an abutting unit that abuts on the stopper when the rack plate is drawn in by the predetermined distance;
  the tray drawing rack formed from an end portion to a position of the tray drawing pinion when the abutting unit abuts on the stopper; and
  a locking unit that engages with the first recess in a maximum extended state of the rack plate, and is pushed out of the first recess when the abutting unit abuts on the stopper and pushed into the second recess to release engagement with the disk tray.

2. A disk changer comprising:
a disk accommodating unit that accommodates a plurality of disk trays, each of the disk trays holding one disk;
a disk processing unit that reproduces data from or records data to a loaded disk; and
a loading mechanism that loads a selected disk together with the disk tray from the disk accommodating unit to a position of the disk processing unit, wherein
the loading mechanism includes
  a tray drawing pinion provided in the disk processing unit;
  a disk tray that is accommodated in the disk accommodating unit and includes a tray rack engaged with the tray drawing pinion; and
  a rack plate that includes a tray drawing rack engaged with the tray drawing pinion, is extendably attached to the disk tray, draws a tray in at a first half process of the loading, and stops the tray at a second half process of the loading to relay a subsequent drawing to the tray rack, wherein
the tray drawing pinion is driven by a motor that activates a clamp cam in the disk processing unit.

3. A disk changer comprising:
a disk accommodating unit that accommodates a plurality of disk trays, each of the disk trays holding one disk;
a disk processing unit that reproduces data from or records data to a loaded disk: and
a loading mechanism that loads a selected disk together with the disk tray from the disk accommodating unit to a position of the disk processing unit, wherein
the loading mechanism includes
  a tray drawing pinion provided in the disk processing unit;
  a disk tray that is accommodated in the disk accommodating unit and includes a tray rack engaged with the tray drawing pinion; and
  a rack plate that includes a tray drawing rack engaged with the tray drawing pinion, is extendably attached to the disk tray, draws a tray in at a first half process of the loading, and stops the tray at a second half process of the loading to relay a subsequent drawing to the tray rack, wherein
each of the disk trays is for vertically placing a disk,
the disk trays are arranged in a radial pattern, and
the disk processing unit is rotated around a predetermined vertical shaft to face a disk tray loaded by the loading mechanism.

* * * * *